United States Patent

Kotaki

[11] Patent Number: 5,646,861
[45] Date of Patent: Jul. 8, 1997

[54] METHOD AND APPARATUS FOR INPUTTING EMBROIDERY LINES

[75] Inventor: Kenji Kotaki, Kishiwada, Japan

[73] Assignee: Shima Seiki Manufacturing Ltd., Wakayama, Japan

[21] Appl. No.: 443,458

[22] Filed: May 18, 1995

[30] Foreign Application Priority Data

May 24, 1994 [JP] Japan .................. 6-135055

[51] Int. Cl.⁶ ............................................ G06F 19/00
[52] U.S. Cl. ................ 364/470.09; 364/470.08; 364/470.06; 112/102.5
[58] Field of Search ................ 364/470, 188, 364/189, 191–193, 474.24, 474.26, 470.06, 470.01, 470.02, 470.07, 470.08, 470.09; 112/121.11, 121.12, 103, 102.5, 266.1, 453–458, 80.23

[56] References Cited

U.S. PATENT DOCUMENTS

| | | | |
|---|---|---|---|
| 4,998,489 | 3/1991 | Hisatake et al. | 112/103 |
| 5,270,939 | 12/1993 | Goldberg et al. | 364/470 |
| 5,319,565 | 6/1994 | Hausammann et al. | 364/470 |
| 5,343,401 | 8/1994 | Goldberg et al. | 364/188 |
| 5,383,413 | 1/1995 | Hayashi | 112/121.12 |

FOREIGN PATENT DOCUMENTS

0 418 643 A2  3/1991  European Pat. Off.

OTHER PUBLICATIONS

Abstract of Japanese Preliminary Published Patent Hei 4-30893 published Feb. 3, 1992.
Abstract of Japanese Preliminary Published Patent Hei 5-131071 published May 28, 1993.

*Primary Examiner*—Paul P. Gordon
*Assistant Examiner*—Thomas E. Brown
*Attorney, Agent, or Firm*—Nikaido, Marmelstein, Murray & Oram LLP

[57] ABSTRACT

A delete mark is displayed at the start end of a directional vector, and a finish mark at the other end thereof. The vector is deleted when the delete mark is touched, and input of the vector is completed when the finish mark is touched.

7 Claims, 6 Drawing Sheets

METHOD AND APPARATUS FOR INPUTTING EMBROIDERY LINES

FIELD OF THE INVENTION

The present invention relates to inputting of embroidery lines to textile products, and more particularly to an input interface for inputting embroidery lines on a computer screen with use of a CAD system.

PRIOR ART

In the case where data as to embroidery lines is input for designs of textile products using a CAD system, the following is known. The names of literature are not given since the literature such as patent publications can not be identified.

1) An original image is fetched as by a scanner for use as a border image for inputting embroidery lines.

2) The fetched original image is retouched to modify the image using input means such as a mouse, cursor, or combination of digitizer and pen.

3) Inputting a large number of embroidery lines individually heavily burdens the operator. Accordingly, an algorithm called Fill is used. With this algorithm, a portion of the border image is specified to designate an input range of embroidery lines. With the border image, the embroidery line input range is divided by lines into a multiplicity of regions, and a particular one of the embroidery line input regions is designated by a mouse or like input means. In the designated region, one or more embroidery vectors indicating the directions of embroidery lines are then input. The direction of each embroidery line is determined, assuming that the individual embroidery lines are parallel to the input embroidery vector, or that the direction differs from line to line when there are a plurality of embroidery vectors. Further the pitch of embroidery lines is input as a parameter in advance.

4) The process 3) terminating with the input of embroidery vectors is repeated, and the input of some embroidery vectors is modified when required.

5) Exquisite embroidery lines which are difficult to process according to the algorithm of Fill are input individually one by one.

6) Upon finishing inputting the embroidery lines, the embroidery data is fed to an embroidery machine or the like.

The algorithm of Fill is intended to reduce the number of embroidery lines to be input, and yet the embroidery data is burdensome to input. For example, suppose embroidery data as to the flower of a sunflower is to be input. The flower has numerous petals and requires inputting of embroidery vectors for each petal. The addition of the stalk and leaves of the flower to the petals further increases the quantity of task. Inputting embroidery images requires, besides the input of embroidery vectors, designation of the deletion of embroidery vectors and the completion of input of the embroidery vectors. Accordingly, at least three kinds of signals need to be input for 1) input of embroidery vectors,
2) deletion of embroidery vectors, and
3) completion of input of the embroidery vectors.

According to the known CAD system, these three kinds of inputs are selectively input using a two-button mouse and menu. For example, embroidery vectors are input with a right click while designating a position on the screen with the mouse. The embroidery vector is deleted with a left click. On completion of embroidery vector input, the menu is referred to to command the completion of vector input from the menu. However, the selective use of the right click or left click and turning the eyes to the menu impose an increased burden on the operator. Consequently, first, vector inputting is likely to be mistaken for vector deletion and vice versa because it is difficult to give inputs with the right click and left click recognized at all times. Next, reference to the menu on completion of embroidery vector input requires turning the eyes from the embroidery data input region to the menu. This burdens the operator. Although a three-button mouse is also usable to eliminate the need for the reference to the menu, it is difficult for the operator to give inputs while always recognizing the three buttons, i.e., the right, middle and left clicks.

While the problem involved in inputting embroidery vectors is described above with reference to Fill as an example, like problem is also encountered in inputting individual embroidery lines one by one. Inputting embroidery lines individually also necessitates three kinds of commands for 1) input of the embroidery lines, 2) deletion of some embroidery lines, and 3) completion of input. As to the deletion of embroidery lines, it is often likely that the embroidery line which has just been input currently will be deleted. Further when a series of embroidery lines have been input, there arises a need to command the completion of input. In view of the foregoing problems, it is necessary to improve the interface for inputting the embroidery vectors or embroidery lines for the improvement of the inputting environment.

SUMMARY OF THE INVENTION

A main object of the present invention is to make it possible to easily input three kinds of signals for inputting embroidery lines or embroidery vectors, deleting such lines or vectors and completing the inputting without reference to a menu.

Another main object of the invention is to make it possible to designate a multiplicity of embroidery lines one by one, with each embroidery line input as readily distinguished from deletion of the embroidery line which is input immediately before the input.

Another main object of the invention is to provide an apparatus for practicing the method as defined in claim 1.

According to the present invention, a CAD system is used for designating an embroidery vector on a screen to thereby input embroidery lines. With the invention, a delete mark is displayed in the vicinity of one end of the designated vector, and a finish mark in the vicinity of the other end thereof. When the delete mark is designated on the screen, the embroidery vector corresponding to the delete mark is deleted. When the finish mark is designated on the screen, embroidery vector processing is completed. The embroidery vector is a vector representing the direction of the embroidery line concerned, and the direction only matters, while the length thereof is not important. Further the vector is the same vector even if the direction thereof is reversed through 180 degrees except where it is used with the start thereof distinguished from its end as defined in claim 2. The delete mark and the finish mark need not be positioned precisely at the end portions of the embroidery vector insofar as they are opposed to each other as positioned in the vicinity of the respective ends of the vector so that one mark is discernible from the other. The delete mark or the finish mark need not be displayed for all the embroidery vectors input. For example, the mark may be displayed for the embroidery vector which has just been input. When the completion of input is to be designated, it is sufficient to display the finish mark in the vicinity of the embroidery vector which is input immediately before the designation, and for example, the delete mark only may be displayed for the preceding embroidery lines.

The embroidery vector is input, for example, by designating two points at opposite ends thereof. Preferably, the delete mark is displayed close to the start (start end) of the vector, and the finish mark close to the end (terminal end) thereof. Further preferably, the screen displays an input range of embroidery lines as divided into a plurality of regions with use of a border image, and the operator designates at least one of the regions and further designates embroidery vectors for the designated region. The known algorithem of Fill is then activated by designating the finish mark. In this procedure, it is desired for the operator to designate a start point and stop point of embroidery for the designated region to generate individual embroidery lines interconnecting the start point and the stop point.

It is preferred to provide a mode in which individual embroidery lines are input one by one, in addition to the Fill mode for the operator to select one of these mode with reference to a menu. In the mode wherein individual embroidery lines are input, the embroidery lines are so generated as to connect a plurality of points, designated by the operator on the screen, with the lines as by a zigzag line, and a select mark is displayed in the vicinity of the terminal end of the embroidery line on the screen. When the operator designates the select mark, a delete mark is displayed in the vicinity of one end of the terminal embroidery line, and a finish mark in the vicinity of the other end thereof. When the delete mark is further designated on the screen, the terminal embroidery line is deleted. Processing the embroidery lines is completed upon designation of the finish mark.

According to the present invention, an apparatus for inputting embroidery lines is used. The apparatus comprises a memory for storing data representing a border image of embroidery, a memory for storing an embroidery image, a monitor for displaying the border image and the embroidery image in a superposed relation and input means for inputting an embroidery vector to the embroidery image memory by designating a position on the monitor. The apparatus is characterized in that it comprises means for displaying on the monitor a delete mark in the vicinity of one end of the embroidery vector and a finish mark in the vicinity of the other end thereof, and means responsive to designation of the delete mark for deleting the corresponding embroidery vector and responsive to designation of the finish mark for commanding completion of processing of the embroidery vector.

Useful for designating positions on the screen and as the input means are a mouse and trackball, cursor, combination of a digitizer and pen, etc., among which the combination of digitizer and pen is preferred. The combination of digitizer and pen has the single function only of designating positions, is easy to use and suited to the invention and facilitates input of coordinates. The mouse or the like to be used may be a two-button or three-button device, but even in this case, all the buttons are made to have the same function so that each button, when pressed, effects the same processing. Preferable as the mouse or like input means is one merely having a single button.

The apparatus of the invention is in the embroidery vector input mode until the delete mark or finish mark is touched or until the select mark is touched when this mark is provided. When deletion or completion is to be effected, the delete mark or the finish mark on the screen is touched. When the select mark is provided, the select mark is touched to retrieve the delete mark and the finish mark onto the screen, and these marks are then touched. If the delete mark is displayed at the start side of the embroidery vector, and the finish mark at the end side thereof, completion of input can be commanded at the position where the screen is accessed finally without a change in position. When deletion is to be effected, deletion is designated at a different position on the screen on the opposite side of the embroidery vector. This diminishes the likelihood of deletion errors.

When such input interface for inputting the embroidery vector, deleting the vector and completing the input is used in combination with the algorithm of Fill, the embroidery data can be input efficiently. In this case, it is desired to designate a start position and an end position for the embroidery yarn before and after the input of the embroidery vector and generate a multiplicity of embroidery lines approximately in parallel to the specified embroidery direction, as interpolated between the two positions to interconnect the positions.

If the finish mark and the delete mark are displayed from the beginning in the case where individual embroidery lines are input one by one, these marks are liable to be accessed in error. For example, the delete mark for an embroidery line which has just been input currently is positioned in the vicinity of the end of the next embroidery line, and if many embroidery lines are input as closely arranged, deletion is liable to occur in error. Accordingly, when the select mark is displayed at the terminal position of the embroidery lines already input, no command is given for deletion or input completion until the select mark is designated. Further because the delete mark is positioned at the end of the terminal embroidery line, it is less likely that the delete mark will be designated in error when the next embroidery line is input. Upon designation of the select mark, the finish mark and the delete mark appear on the screen, enabling the operator to command deletion of the last embroidery line input or completion of input.

According to the present invention, three kinds of inputs for inputting the embroidery vector, deleting the vector and completing the input can be given easily without reference to a menu (claims 1 to 7). Unless the marks for these are touched, the input made is for embroidery lines, and the delete mark, when touched, deletes the embroidery vector. Touching the finish mark effect completion of input. Accordingly, the three kinds of inputs can be given without selectively using the buttons on the input means and without access to any menu. Furthermore, the invention makes it possible to use input means, such as the combination of digitizer and pen, which merely has the function of specifying coordinates and which is not adapted to handle different inputs.

According to the invention as defined in claim 2, the delete mark is displayed at the start side of the embroidery vector, and the finish mark at the end side thereof, so that when completion of input is to be commanded, the same position as designated immediate before the completion can be designated. The completion of input can therefore be commanded smoothly. The input means needs to be shifted in the case of deletion. This reduces the likelihood of inadvertent deletion of the embroidery vector.

According to the invention as defined in claim 3, many embroidery lines can be input by designating a small number of embroidery vectors for every region, using the input interface of claim 1 for the algorithm of Fill.

According to the invention as defined in claim 4, a start point and an end point are readily designated for the embroidery yarn by causing the operator to designate the start point and end point of embroidery.

When many embroidery lines are to be designated one by one according to the invention as defined in claim 5, a new embroidery line can be input as readily distinguished from deletion of the embroidery line which is input immediately before the inputting. Neither the delete mark nor the finish mark is displayed until the select mark is input, and input is merely repeated. The select mark is located in the vicinity of the position where the last input is given, at one side of the line segment opposite to the next position for inputting an embroidery line. This reduces the likelihood of designating the select mark in error. Since the delete mark is not displayed until the select mark is designated, input can be made even at a position immediately adjacent to the position where the preceding input is given. Similarly, completion of input can be input readily by touching the select mark and then touching the finish mark.

The invention as defined in claim 6 provides an apparatus suited to the invention as defined in claim 1. The invention as defined in claim 7 restricts the input means to the combination of a digitizer and a pen which is suited to the invention.

EMBODIMENT

Figure 4:
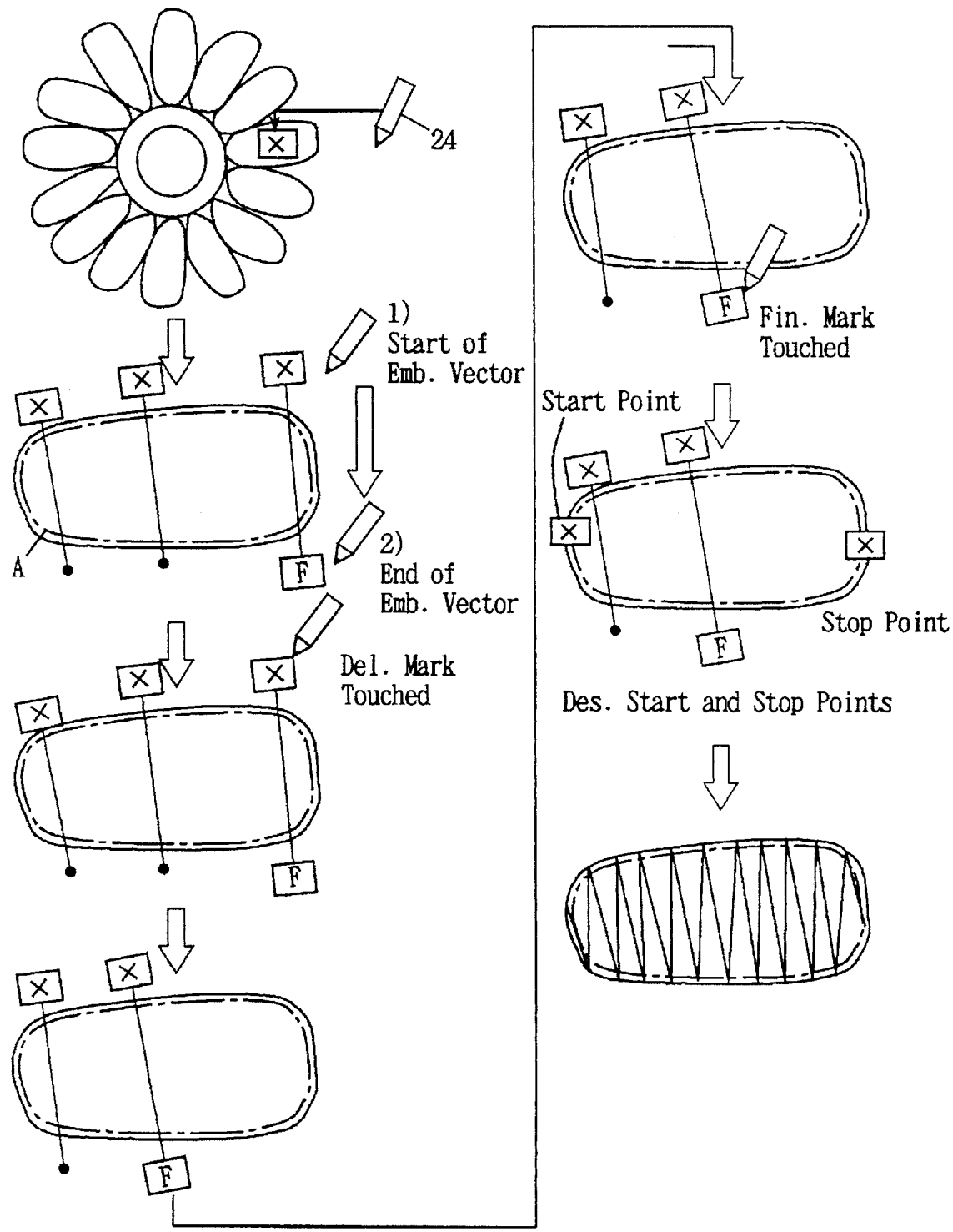
FIG. 4 is a diagram showing the relationship involved in the Fill mode of the embodiment between manipulation of a pen and embroidery vector inputs.
Figure 5:
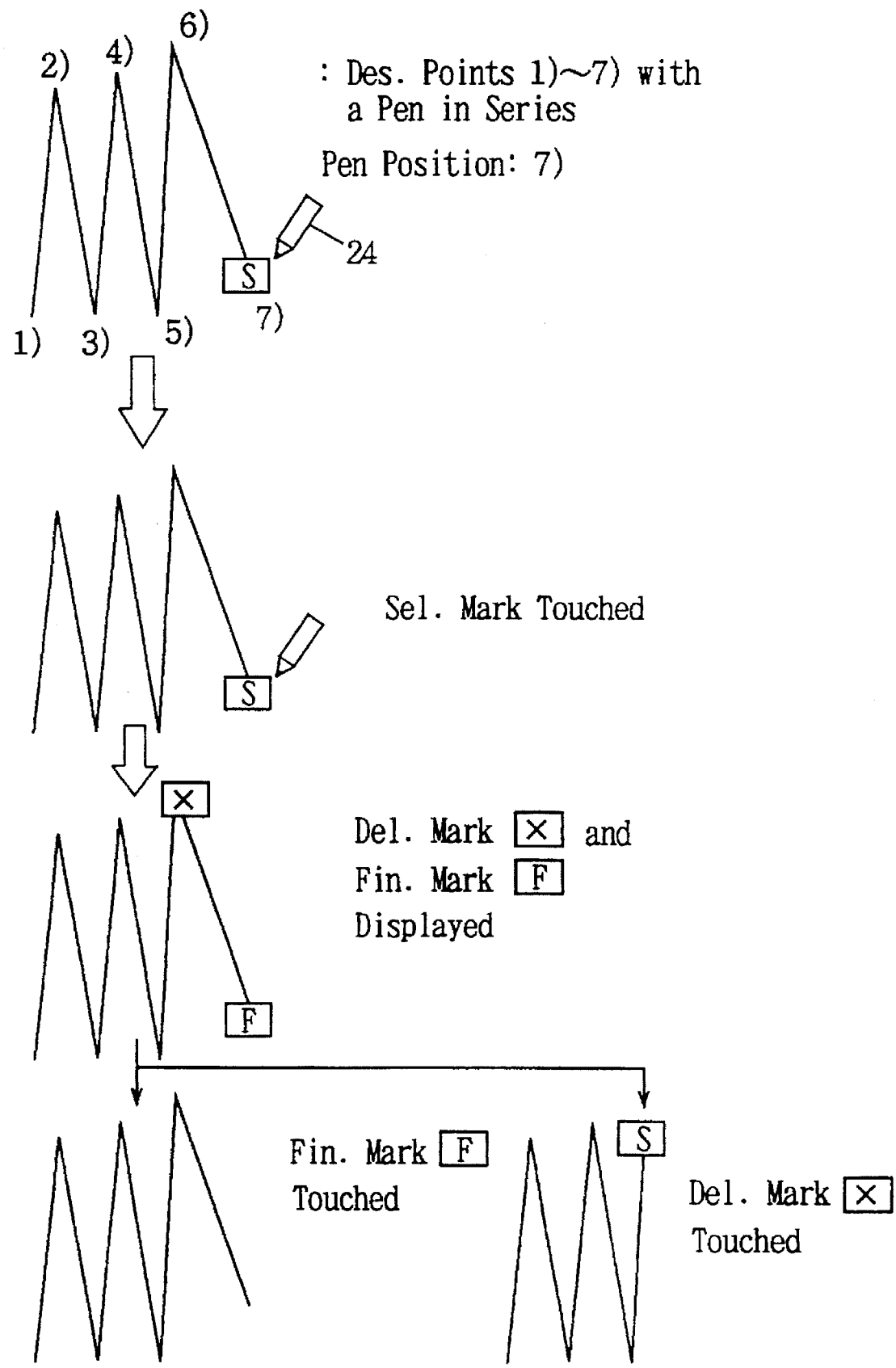
FIG. 5 is a diagram showing the relationship involved in the individual stitch mode of the embodiment between manipulation of the pen and embroidery line inputs.
Figure 6:
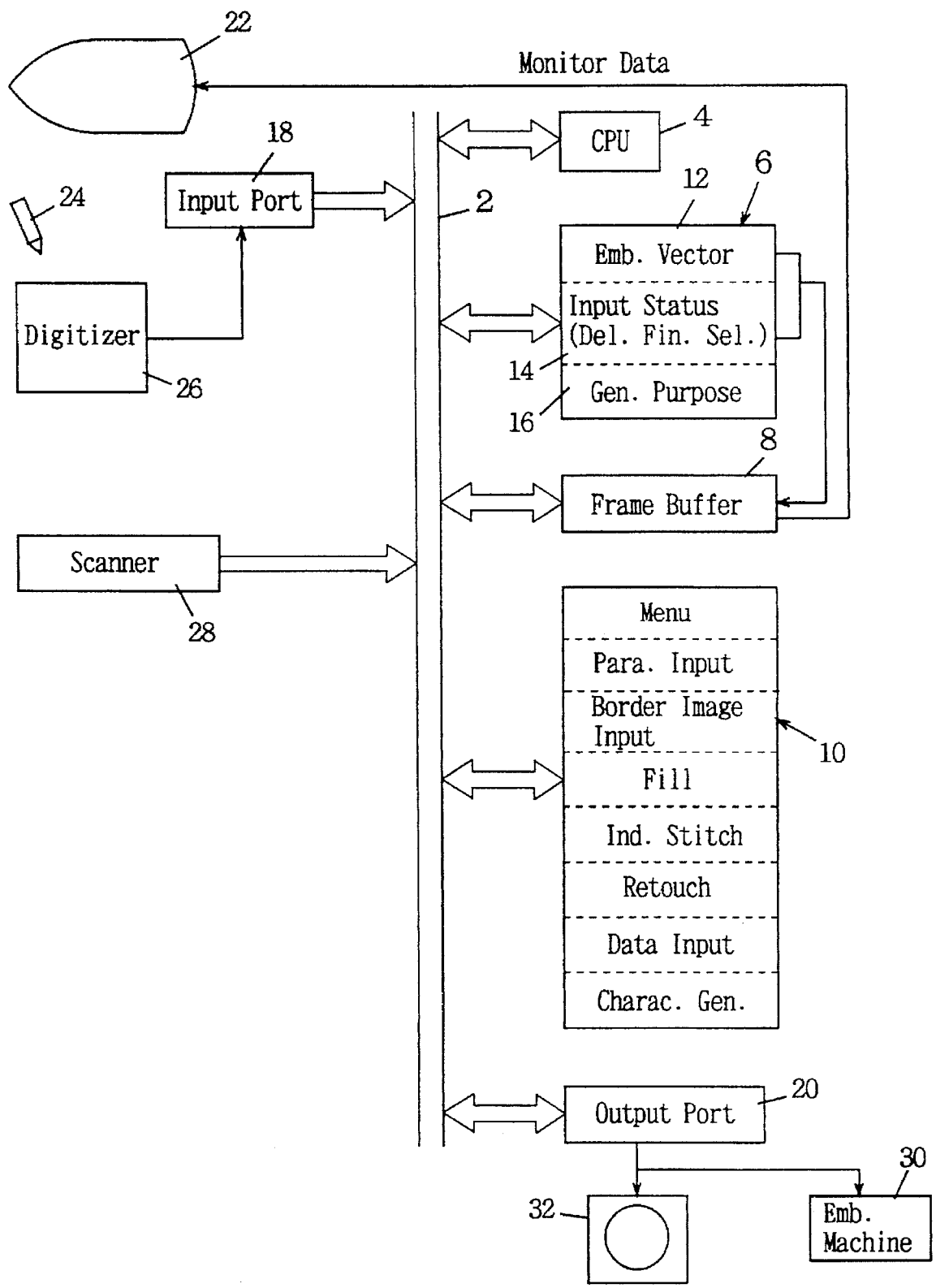
FIG. 6 is a block diagram of an apparatus for inputting embroidery lines according to the embodiment.

FIGS. 1 to 6 show an embodiment. FIG. 6 shows the construction of an embroidery CAD apparatus. The drawing shows a bus 2 and a CPU 4 which is a processing unit for accepting inputs, correcting data, modifying the flow of programs, etc. Indicated at 6 is a main memory, at 8 a frame buffer for storing a border image fetched as by a scanner, and at 10 a ROM having programs stored therein. The main memory 6 comprises three portions, i.e., an embroidery vector storage portion 12 for storing the directions of embroidery lines as embroidery vectors, an input status storage portion 14 for storing states of delete marks, finish marks and select marks in connection with the embroidery vectors and whether display of such marks is necessary, and a general purpose storage portion 16 for storing other data. Of course, the main memory 6 need not be physically divided into three blocks but may be divided into the three portions in actual effect. The border image, which can be a vector image, is a raster image according to the present embodiment, and is stored in the frame buffer 8. Indicated at 18 is an input port, at 20 an outlet port, at 22 a monitor, at 24 a pen (stylus) and at 26 a digitizer. The pen 24 is used for designating a position on the monitor 22, and the resulting signal is sent to the input port 18 via the digitizer 26. Indicated at 28 is the above-mentioned scanner, at 30 an embroidery machine and at 32 a disc such as a floppy disc.

The present apparatus is characterized by the interface for the inputs from the pen 24; the delete mark, finish mark and select mark are displayed on the monitor 22, and touching these marks effects changes of processing. The data relating to deletion, completion and selection and necessary for these changes is stored in the input status storage portion 12 of the main memory 6 and processed by the CPU 4. However, the input port 18 may be made to store the data as to the delete mark, finish mark and select mark for processing by a front-end processor. The ROM 10 has stored therein a menu processing program, input processing program for parameters such as the pitch of embroidery lines, processing program for the border image from the scanner 28 or pen 24, Fill processing program, processing program for individual stitch inputs, processing program for retouches with the pen 24 after embroidery data input, processing program for data outputs from the output port 20, program for generating the characters of the delete mark, finish mark and select mark, etc.

Figure 1:
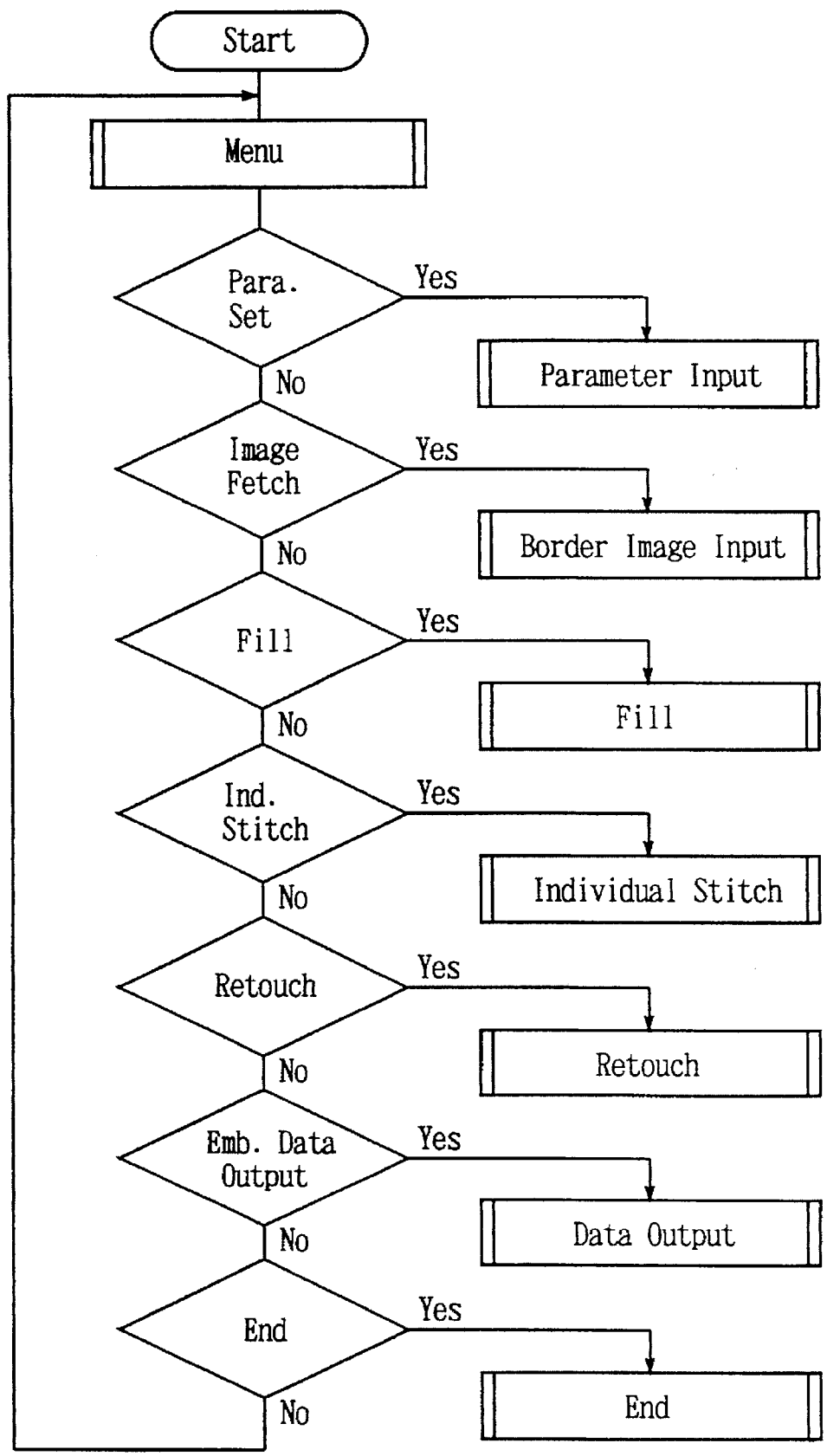
FIG. 1 is a flow chart showing an overall algorithm for practing a method of inputting embroidery lines according to an embodiment.

FIGS. 1 to 5 show input of embroidery data and the operation of the apparatus relating thereto. FIG. 1 shows an overall algorithm relating to the input of embroidery data. The embroidery CAD system is menu-driven for operation; procedures are selected with reference to a menu to effect parameter input, followed by processing procedures including the output of embroidery data. For parameter input, for example, the pitch of the embroidery lines to be generated is input in the Fill mode. For border image input, an original image is fetched by the scanner 28 and corrected or modified with the pen 24 into an embroidery border image, which is then stored in the frame buffer 8. Embroidery vectors, delete marks, finish mark, select mark and the like are superposed on the border image, which is then stored in the frame buffer 8 and displayed on the monitor 22. In retouching, the embroidery lines as input are corrected again with the pen 24; for example, some embroidery lines are deleted or added one by one. For data output, the completed embroidery data is output from the main memory 6 to the embroidery machine 30 or to the disc 32. Among these processing procedures, the present invention is characterized by an algorithm according to Fill and input of individual embroidery lines.

Figure 2:
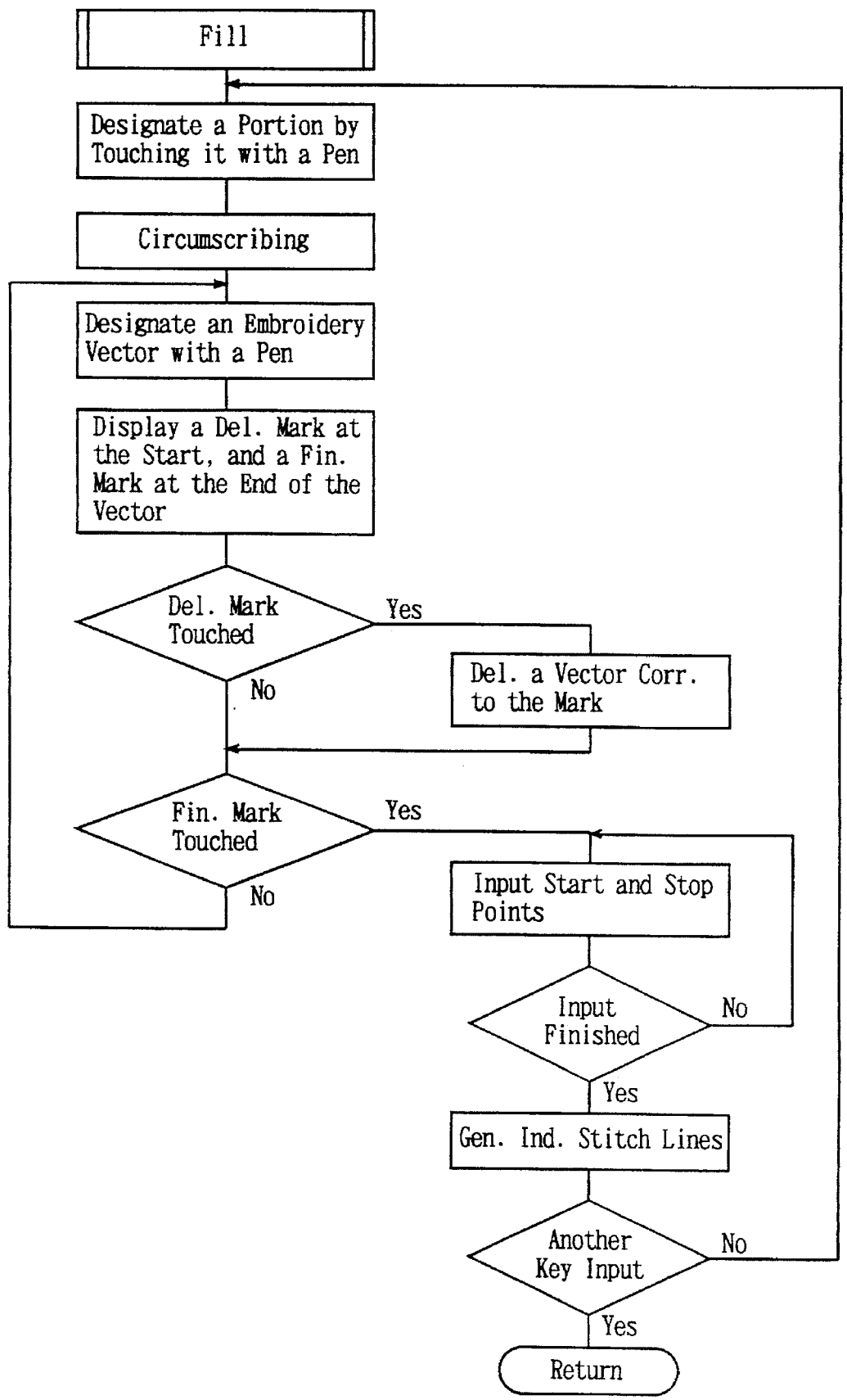
FIG. 2 is a flow chart showing the method of the embodiment for inputting embroidery lines in a FIG. 1 mode.

FIG. 2 shows the algorithm of Fill according to the embodiment, and FIG. 4 shows changes in the image displayed on the monitor 22. In this mode, the border image stored in the frame buffer 8 is used to designate a region with the pen 24 to specify the region to be subjected to Fill. For example, embroidery of a flower pattern is to be made as shown in FIG. 4. When the operator designates, for example, one petal with the pen 24, this portion is displayed, for example, on an enlarged scale. Next a circumscribing embroidery line is generated as indicated in the broken line A in FIG. 4 along the contour of the designated region and is stored in the embroidery vector storage portion 12. The operator then inputs a desired number of embroidery vectors with the pen 24. The embroidery vector is designated by designating the start and end thereof with the pen 24, and a delete mark and a finish mark are displayed respectively at the start portion and the end portion. The start and the end are identified as such by interpreting a point touched with the pen 24 first as the start, and another point subsequently touched as the end. The delete mark is displayed for each of the embroidery vectors within the region, while the finish mark is displayed only for the embroidery vector input last. Only one finish mark is displayed in order to render the mark readily discernible and to display the finish mark at a point which is designated immediately before designating completion of input so that the completion can be designated at the same position. The embroidery vectors are stored as vector data by the main memory 6 in its embroidery vector storage portion 12. Thus, the coordinates of the start and end of each vector are stored. The general purpose storage portion 16 stores the fact that the apparatus is in the Fill mode and the particular region designated. The input status storage portion 14 stores the fact that the delete mark is displayed in connection with the start of the vector and that the finish mark is displayed as associated with the vector end. In corresponding relation to this, the character generating program is retrieved from the ROM 10 to write the delete mark and finish mark to the frame buffer 8. Similarly, images of the embroidery vectors are written to the frame buffer 8 to display the images along with the marks. If the region is simple, and the embroidery vectors are oriented in one direction, only one vector may be input, while if the orientation differs at an intermediate portion of the region, about two or three vectors are input.

When the delete mark is touched with the pen 24, that is, when the delete mark is accessed on the monitor 22, the corresponding embroidery vector is deleted. In the case of FIG. 4, for example, the embroidery vector input last at the right end is deleted. Despite the deletion, the apparatus still remains in the embroidery vector input mode, such that if a new vector is input in place of the deleted vector, the new vector is stored as the next embroidery vector. When a number of embroidery vectors required for Fill are input to designate the direction of embroidery lines, the finish mark is touched with the pen 24. Touching the finish mark means completion of embroidery vector input.

Upon the designation of the finish mark, the following two points input are interpreted as a start point for the embroidery yarn (inlet of the yarn into the region) and a stop point for the yarn (outlet of the yarn from the region) provided that the designated points are positioned in the vicinity of the border of the region. When the start point and end point are designated with the pen 24, the coordinates of these points are stored in the general purpose storage portion 16, and embroidery lines are generated so that: 1) the embroidery yarn extends from the start point to the stop point, 2) is interpolated between the embroidery vectors and oriented approximately in parallel to the embroidery vectors, and 3) varies in orientation from line to line between the orientations of the embroidery vectors at opposite sides when a plurality of vectors are present. For this purpose, it is required that: 1) the embroidery line be reversed every time the line contacts the border of the region, 2) the pitch of the embroidery lines or the angle between two embroidery lines at the intersection of the line and the border image be approximately equal to a value specified in advance, 3) the orientation of the embroidery lines be restricted by the embroidery vectors, and 4) the positions of the inlet and outlet of the embroidery yarn be in match with the start point and the stop point, respectively. Incidentally, the term of the pitch of embroidery lines is herein used in a broad sense, and the abovementioned angle is to be included in the pitch. The program to be executed for fulfilling these requirements is stored in the ROM 10, and the data to used includes the embroidery vectors and the coordinates of the start point and stop point stored in the main memory.

When the processing for one petal has been finished in the case of FIG. 4, the next procedure to be executed next is 1) inputting embroidery lines similarly according to the algorithm of Fill for another region, or 2) return to the menu for effecting different processing. Therefore in the case where a key other than Fill is accessed on the menu, the procedure concerned follows, or if otherwise, the Fill mode is continued to effect the same processing as above for the next region designated with the pen 24.

Figure 3:
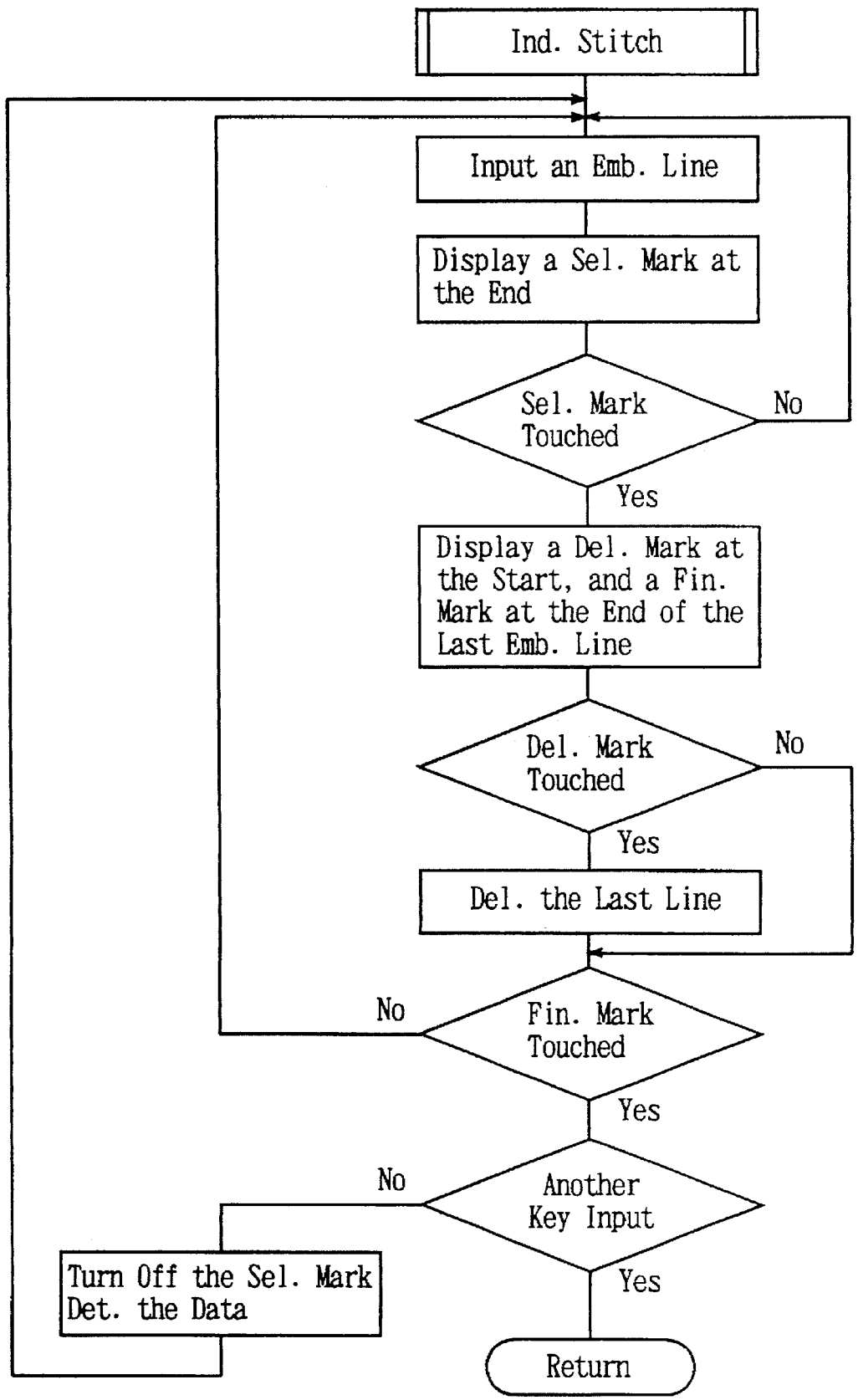
FIG. 3 is a flow chart showing the method of the embodiment for inputting embroidery lines in an individual stitch model

The algorithm of Fill is limited to input of embroidery lines only, based on border images. Accordingly, an individual stitch mode is provided in which embroidery lines are input individually and which is called up with reference to the menu for execution. FIG. 3 shows an algorithm in this mode. FIG. 5 shows changes in the display image on the monitor 22. In this mode, embroidery vectors have the same meaning as embroidery lines. In the individual stitch mode, the start of each embroidery line and then the end thereof are designated, and every time one point is designated, the embroidery line is reversed in orientation. In the case of FIG. 5, suppose seven points 1) to 7) are designated, for example. In the meantime, a select mark is displayed always at a point designated last. For this purpose, the coordinates of the points 1) to 7) in FIG. 5 are stored in the embroidery vector storage portion 12. The coordinates are stored in the order in which they are designated. The fact that the select mark is displayed in connection with the last coordinates is stored in the input status storage portion 14. Images of the embroidery lines and the select mark are written to the frame buffer 8 and displayed on the monitor 22.

The necessary processing other than the input of embroidery lines is deletion of embroidery lines and processing for input completion. The deletion is predominantly for the deletion of embroidery lines effected immediately before the subsequent input. When the embroidery line is to be deleted in other case, a retouching procedure is performed upon a change of mode. When the embroidery line is to be deleted or input completion is to be input, the select mark is touched with the pen 24. The select mark is displayed at only one location centered at the coordinates which are input last, and is located at one side which is opposite to the coordinates to be input for the next embroidery line with respect to the embroidery line. It is therefore less likely to touch the select mark in error. When the select mark is touched, a finish mark appears at the position where the select mark was present, and a delete mark appears on opposite side of the embroidery line. In the case of deletion, therefore, the select mark is touched, the pen 24 is moved, and the delete mark on opposite side of the embroidery line is touched. When the operator intends to effect deletion at a point, moving the pen 24 toward that point is a natural pattern of movement. Completion is input by touching the select mark and touching the finish mark at the same position. Touching the delete mark deletes the last embroidery line, and the data in the memory 6 and the frame buffer 8 is rewritten in corresponding relation to the deletion to resume input of another embroidery line. Consequently, a select mark appears at the position where the delete mark was present, and a new embroidery line is generated to connect this position to another position subsequently designated with the pen 24. Upon input of the new line, the select mark is shifted. When the finish mark is touched, other key on the menu is checked as to whether it is accessed. If no access is found, another embroidery line is to be input with a point designated next with the pen 24 serving as the start point of the line. If some other key is accessed, the procedure corresponding to the key is executed.

Although specific hardware construction and algorithms are illustrated, the invention is not limited thereto. Desired characters are usable for the delete, finish and select marks.

What I claim is:

1. A method of inputting embroidery lines by designating an embroidery vector on a screen using a CAD system, the method comprising the steps of:

displaying a delete mark in the vicinity of one end of the designated embroidery vector on the screen, wherein an embroidery vector designates a direction of an embroidery line;

displaying a finish mark in the vicinity of the other end of the designated embroidery vector on the screen;

deleting the embroidery vector when the delete mark corresponding to the embroidery vector is designated on the screen; and completing processing of the embroidery vector when the finish mark is designated on the screen.

2. A method of inputting embroidery lines as defined in claim 1, wherein the start and the end of the embroidery vector are designated, the delete mark is displayed in the vicinity of the start of the embroidery vector, and the finish mark is displayed in the vicinity of the end of the vector.

3. A method of inputting embroidery lines by designating an embroidery vector on a screen using a CAD system, the method comprising the steps of:

dividing a range of inputting the embroidery lines into a plurality of regions with use of border data and displaying each of the divided regions as surrounded by a border line on the screen;

storing at least one of the regions on the screen designated by the operator;

storing the embroidery vector when the vector is input by the operator for the designated region;

displaying a delete mark in the vicinity of one end of the designated embroidery vector on the screen, wherein an embroidery vector designates a direction of an embroidery line;

displaying a finish mark in the vicinity of the other end of the designated embroidery vector on the screen;

deleting the embroidery vector when the delete mark corresponding to the embroidery vector is designated on the screen; and generating the embroidery lines individually with a specified pitch approximately in parallel to the embroidery vector to fill the designated region when the finish mark is designated.

4. A method of inputting embroidery lines as defined in claim 3, further comprising the steps of causing the operator to designate a start point and a stop point of embroidery for the designated region, and generating the embroidery lines individually so as to interconnect the start point and the stop point therewith.

5. A method of inputting embroidery lines as defined in claim 3, further comprising the steps of:

displaying in a menu on the screen a mode in which the embroidery vector is designated for the designated region and a mode in which the embroidery lines are individually input one by one for the operator to select one of the modes;

generating the embroidery lines so as to connect a plurality of points designated by the operator on the screen with the embroidery lines in the form of a zigzag line and displaying a select mark in the vicinity of the terminal end of the embroidery line on the screen when the latter input mode is selected;

displaying the delete mark in the vicinity of one end of the terminal segment of the embroidery lines on the screen and the finish mark in the vicinity of the other end thereof when the select mark is designated on the screen;

deleting the terminal segment of the embroidery lines when the delete mark is designated on the screen; and completing processing of the embroidery lines when the finish mark is designated on the screen.

6. An apparatus for inputting embroidery lines having a memory for storing data representing a border image of embroidery, a memory for storing an embroidery image, a monitor for displaying the border image and the embroidery image in a superposed relation and input means for inputting an embroidery vector to the embroidery image memory by designating a position on the monitor, the apparatus for inputting embroidery lines comprising:

means for displaying on the monitor a delete mark in the vicinity of one end of the embroidery vector and a finish mark in the vicinity of the other end thereof, the embroidery vector identifying a direction of an embroidery line; and means responsive to designation of the delete mark for deleting the corresponding embroidery vector and responsive to designation of the finish mark for commanding completion of processing of the embroidery vector.

7. An apparatus for inputting embroidery lines as defined in claim 6, wherein the input means comprises a digitizer and a pen.

* * * * *